United States Patent [19]

Moreau et al.

[11] Patent Number: 5,913,168
[45] Date of Patent: Jun. 15, 1999

[54] METHOD OF CONTROLLING HANDOVER IN A MULTICELLULAR RADIO COMMUNICATIONS NETWORK, AND SPEED ESTIMATION METHODS RELATING THERETO

[75] Inventors: Christophe Moreau, Bievres; Jean-François Minet, Viroflay; Christophe J. Vidal, Cormeilles En Parisis, all of France

[73] Assignee: France Telecom, Paris, France

[21] Appl. No.: 08/661,798

[22] Filed: Jun. 13, 1996

[30] Foreign Application Priority Data

Jun. 16, 1995 [FR] France .................. 95 07230

[51] Int. Cl.$^6$ .................................. H04Q 7/20
[52] U.S. Cl. .................. 455/441; 455/437; 455/444; 342/109
[58] Field of Search .................. 455/437, 441, 455/444, 425; 370/331; 342/109, 107

[56] References Cited

U.S. PATENT DOCUMENTS

| | | | |
|---|---|---|---|
| 5,239,667 | 8/1993 | Kanai | 455/441 |
| 5,396,253 | 3/1995 | Chai | 455/441 |
| 5,396,645 | 3/1995 | Huff | 455/441 |
| 5,657,487 | 8/1997 | Doner | 455/441 |
| 5,722,072 | 2/1998 | Crichton et al. | 455/437 |

FOREIGN PATENT DOCUMENTS

| | | |
|---|---|---|
| 2 273 424 | 6/1994 | United Kingdom . |
| WO 92/01950 | 2/1992 | WIPO . |
| WO 92/12602 | 7/1992 | WIPO . |

OTHER PUBLICATIONS

European Telecommunication Standard, pr ETS 300 578, Mar. 1995, 2nd Edition, 19 pages.

*Primary Examiner*—Edward F. Urban
*Assistant Examiner*—Seid Raju
*Attorney, Agent, or Firm*—Oliff & Berridge, PLC

[57] ABSTRACT

In a multicellular radio communications network, when a mobile station satisfies a criterion for automatic intercellular handover from a source cell to a target cell, the speed of movement of the mobile station with respect to the base station of the target cell is estimated on the basis of the measured levels of the signal which the mobile station has received from this base station before the handover criterion is satisfied. Depending on the layers of the cells concerned, it is then possible to take account of this speed estimate in order to decide whether or not to trigger intercellular handovers.

12 Claims, 5 Drawing Sheets

METHOD OF CONTROLLING HANDOVER IN A MULTICELLULAR RADIO COMMUNICATIONS NETWORK, AND SPEED ESTIMATION METHODS RELATING THERETO

BACKGROUND OF THE INVENTION

The present invention relates to a method of controlling intercellular handover (HO) in a multicellular radio communications network, as well as to methods for estimating speeds of movement of mobile stations, which can be used in implementing such handover control method.

Mobile radio communications systems mainly comprise the equipments of the mobile telecommunications service and the mobile stations. The equipments of the mobile telecommunications service generally consist of two subassemblies: the message routing and management system on the one hand, and the radio system on the other hand.

The message routing and management system has as its main functions: interconnection of the radio communications system with a static network (for example the public switched telephone network), recognition and analysis of connection requests from static or mobile subscribers, the search for static or mobile correspondents, management of resources in terms of radio channels and of links with the static users, routing of messages from the user to the radio channel and supervision of communications. To do that the system comprises switches, computers and databases (which, in particular, store the information relating to the subscribers).

The radio system undertakes the radio transmission of messages between the parties. Its main functions are therefore message transmission by means of radio, supervision of the continuity of the links and protection against third parties. The radio system consists of radio relays called base stations, which may be static or mobile (satellites for example).

In order to optimize the use of the radio spectrum, in particular in zones with high subscriber density, a partitioning into cells, based, for example, on the technique of frequency reuse or of dynamic channel allocation, has been adopted in the majority of systems. For that reason these systems are called cellular networks.

One of the important functions of the message routing and management system consists in ensuring the continuity of the communication when a terminal is moving. The mobile radio communications system must, in fact, avoid the link being cut between the terminal and the static network, particularly when this link is supporting a communication. Cut off can occur in particular when the mobile crosses the boundary of the cell to which it is attached. It is then a question of allowing handover of the link from the base station left behind to a new base station which will be able to serve the mobile satisfactorily (that is to say which will make it possible to provide the link established with the characteristics of the service or services required). From a general point of view, HO ("handover" or "handoff") consists in changing the physical channels (radio channel and/or channel of the support network which are associated with the service connection) which are necessary to maintain the communication.

In zones with high subscriber density, small-size cells are formed (called microcells or picocells). These cells are used to serve low-speed or static mobiles, that is to say mainly pedestrians. As far as higher-speed mobiles are concerned, for example motor cars, the times needed to execute a HO between microcells or picocells may be too short for these mobiles to be able to be connected thereto (such cells may constitute one or two layers of cells). It is for this reason that a network of more extensive cells, called macrocells or umbrella cells, intended to serve mobiles of relatively "high" speed, is superimposed on these small-size cells. This network may also serve as a backup to the network of small-size cells.

Moreover, the high speed of some trains as well as the appearance of mobiles in aircrafts require that the HO algorithm has to usable in networks with several layers (>2). It is indeed possible to imagine a mobile in a train, with zero speed of movement in a station, low speed on leaving the station and high speed when the train is at full speed.

A network consisting of several layers of cells is called a "multilayer" network, "multicellular" network or also "microcellular" network, this latter term being reserved for the case of one layer of microcells and one layer of macrocells.

In "conventional" mobile networks, that is to say networks consisting of a single layer of cells the radius of which is generally a few kilometers (typically 1 km to 30 km), the HO algorithms are based mainly on criteria of field level, of signal quality (for the digital systems), of mobile-base station distance and of signal attenuation (comparison of the attenuation of signals originating from several base stations).

In general, when a mobile moves away from the base station to which it is attached, the field level which it receives therefrom (as well as that which the base station receives from the mobile) decreases, the number of erroneous bits in the messages exchanged increases as does the distance and the attenuation of the signals sent.

The decrease in the field level does not occur uniformly. The radio frequency signal is in fact subject to three types of variations, average attenuation, slow fading, and rapid fading. Average attenuation is the only one of the three components which is present in an environment free of any obstacle. Slow fading is due to the presence of obstacles to propagation, such as buildings, and depends on the speed of movement of the mobile. It causes a slow variation in the signal about the average field. Rapid fading is due to multiple paths which a signal can take in order to propagate from a transmitter to a receiver due to diffraction or reflection from buildings. It generates a rapid variation in the signal.

When the received field level becomes too weak, the signal quality too poor or the distance too great, the message routing and management system can trigger a HO by seeking the base station which is the most suitable to continue the communication.

A HO can also be triggered, on an attenuation criterion, even before one of the three foregoing criteria is satisfied; to do that, it is sufficient for the attenuation of the field level received from a neighboring base station to be lower, to within a margin, than that of the base station to which the mobile is attached.

In the European GSM system, this type of criterion is called PBGT (Power BudGeT), and the margin HO_MARGIN(n1,n2) (n1: source cell, n2: target cell). It ensures that the mobile will be attached to the base station with lowest attenuation. It makes it possible, in particular, to minimize interference in frequency-reuse systems. In the particular case of GSM networks, the measurements made by the mobile are transmitted to the network over the SACCH uplink channel (MEASUREMENT REPORT message) every 480 ms (or every 960 as if the current service is the short-messages service). The measurements taken by the base station (BTS) to which the mobile is attached are added to those received in the MEASUREMENT REPORT message from the mobile, in order to form the MEASUREMENT RESULT message which is sent to the base station controller (BSC). It is on the basis of this information that the BSC can, for example, trigger a HO. The measurements taken and the associated procedures are described in GSM Recommendation 05-08 (draft pr ETS 300 578, 2nd edition, March 1995, European Telecommunications Standards Institute). Annex A to this Recommendation gives a complete example of a HO and power monitoring algorithm.

The document GB-A-2,273,424 describes a HO control method for a single-layer network, comprising an anticipated estimation of the instant at which a mobile station will cross the boundary between two cells. This instant is estimated on the basis of an extrapolation of the DISTANCE parameter included in the MEASUREMENT REPORT message, deduced from the TIMING ADVANCE parameter necessary for TDMA operation. However, the precision in this distance parameter is only of the order of 500 m, so that this method can be used only for source cells of relatively large size. The document further proposes to monitor the profile of the signal level received by the mobile station from the base station of the source cell, in order to inhibit the handover when a rapid mobile station suffers significant masking (typically, a mobile station on board a train passing through a tunnel). However, this assumes a prior knowledge of the trajectory of the mobile, and does not make it possible, in the general case, to distinguish between the slow fading affecting a rapid mobile and the rapid fading affecting a slow mobile.

In the case of a multicellular network, it is sought to assign the "rapid" mobiles to the macrocells and the "slow" mobiles to the microcells. One known solution for taking account of the speed of movement of the mobiles consists in delaying the triggering of the HO. When a handover criterion (PBGT for example) is satisfied, a time delay is triggered. If the mobile is rapid and connected to a macrocell, the PBGT criterion for handover to a microcell will no longer be satisfied on expiry of the time delay, since the mobile will have passed through the microcell. In this case, the mobile does not perform a HO. If the mobile is rapid and is connected to a microcell, it will trigger a HO on field level before the expiry of the time delay. In this case, only one macrocell is allowed to be the candidate. If the mobile is slow and is connected to a macrocell, the PBGT criterion for handover to a microcell will always be satisfied upon expiry of the time delay. In this case, a HO to the microcell will be performed. If the mobile is slow and is connected to a microcell, the PBGT criterion for handover to another microcell will always be satisfied upon expiry of the time delay. In this case, a HO to the target microcell will be performed. If the PBGT criterion for handover is satisfied for a macrocell, then the mobile will trigger a HO to that macrocell.

In three of the four cases mentioned above, it is necessary to wait until expiry of the time delay in order to take a decision concerning the HO. A typical value for this time delay is 40 seconds. The additional movement performed by the mobile during this time may therefore be significant. Moreover, a rapid mobile connected to a microcell will have to wait until a handover criterion on field level is satisfied in order to perform a HO, which also delays the handover.

Due to this wait, the interference generated by frequency reuse is greater than it is with a method which makes it possible to trigger the HO as soon as the handover criterion is satisfied.

One object of the present invention is to propose a method making it possible, in a multicellular network, to trigger intercellular handovers rapidly by taking account of the speed of movement of the mobile stations.

SUMMARY OF THE INVENTION

The invention thus proposes a method of controlling handover in a multicellular radio communications network including cells of layer m, for m ranging from 1 to M, a cell of layer m+1 ($1 \leq m < M$) including a base station intended to communicate with mobile stations generally moving more rapidly than the mobile stations with which the base stations of cells of layer m are intended to communicate. In this method, measurements are taken of communication parameters between, on the one hand, a mobile station assigned to a source cell and, on the other hand, the base station of the source cell and at least one base station of a neighboring cell, the measured communication parameters including the level of at least one signal received by the mobile station from the base station of a neighboring cell, measured by the mobile station at successive measurement instants spaced by a constant measurement interval. The measured parameters are analyzed in order to determine those instants at which the mobile station satisfies a criterion for handover from the source cell to a neighboring target cell. When the analysis of the measured parameters shows that the mobile station satisfies a criterion for handover from a source cell of layer m+1 to a target cell of layer m ($1 \leq M$), the speed of the mobile station with respect to the base station of the target cell is estimated on the basis of the measured levels of the signal which the mobile station has received before said handover criterion is satisfied from the base station of the target cell, a handover to the target cell is performed if the estimated speed is below a first speed threshold, and the assignment to the source cell is maintained if the estimated speed is above the first speed threshold.

Hence a mobile station assigned to a cell of layer m+1 can be handed over to a cell of layer m only if its speed is sufficiently low. Thus, assigning relatively rapid mobiles to cells of low layers is avoided. This decision can be taken almost as soon as the handover criterion is satisfied, since it is based on previous measurements.

It is advantageous, particularly in microcellular networks, for the measurements serving for the speed estimate to be those relating to the lower-layer target cell. This is because, if the mobile is rapid, there is a much greater probability of it moving radially to the target cell (that is to say in such a way that its speed has a relatively significant influence on the measured signal level) than of it moving radially to the higher-layer source cell. The speed estimate is thus more reliable, and there is relative confidence in the detection of the cases (rapid mobiles) in which a decision other than that of the standard HO algorithm is adopted.

For preference, when the analysis of the measured parameters shows that the mobile station satisfies a criterion for handover from a source cell of layer m to a target cell of the same layer m ($1 \leq m < M$), the speed of the mobile station with respect to the base station of the target cell is estimated on the basis of the measured levels of the signal which the mobile station has received before said handover criterion is satisfied from the base station of the target cell, and a handover to the target cell is performed if the estimated speed is below a second speed threshold. When, on the one hand, the analysis of the measured parameters shows that the mobile station satisfies a criterion for handover from a source cell of layer m to a first target cell of layer m ($1 \leq m < M$), and, on the other hand, the estimated speed of the mobile station with respect to the base station of the first target cell is above the second speed threshold, a handover to a second neighboring target cell of layer m+1 is performed if the measured level of the signal received by the mobile station from the base station of said second target cell is above an acceptance threshold, and a handover to the first target cell is performed if the measured level of the signal received by the mobile station from each neighboring cell of layer m+1 is below the acceptance threshold.

In this way, a mobile station detected as being rapid with regard to layer m can be prevented from executing a HO to another cell of this layer m. It is preferable for the signal level measurements taken into consideration to be those relating to the target cell, since the pertinent measurements relating to the source cell can be affected by a problem of clipping. The values relating to the source cell are generally higher and may therefore be at saturation, which affects the speed estimate based on their profile.

The invention also proposes methods for estimating the speed of movement of the mobile stations, which are suitable for implementing the HO control methods referred to above, but which could equally well be applied in other cases where a speed estimate is required.

Hence the invention proposes a method for estimating the speed of movement of a mobile radio communications station with respect to a base station of a cellular network, comprising the following stages:

the level of a radio signal received by one of the two stations from the other station is measured at successive measurement instants spaced by a constant measurement interval;

average values of the signal levels measured are calculated over a sliding window, the average value $R(i)$ relating to a measurement instant i being an average of the signal levels measured at the instants $i-L+1$ to i, L designating an integer representing the size of the sliding window;

having obtained at least Nmin average values relating to Nmin consecutive measurement instants immediately preceding a measurement and estimation instant N0, Nmin designating an integer, the oldest measurement instant N0−J is determined, at least Nmin and at most Jmax measurement intervals before the instant N0, Jmax designating an integer at least equal to Nmin, such that, for every pair of integers j, k such that $1 \geq k < j \geq J$, the difference $E(j,k)=|(1-k/j).R(N0)+(k/j).R(N0-k)|$ is less in absolute value than a predetermined threshold Emax, and the speed is estimated at the instant N0 on the basis of the gradient $|R(N0)-R(N0-J)|/J$.

The comparisons of the differences $E(j,k)$ amount to determining the oldest measurement instant N0−J such that, for any instant N0−j, such that $N0-J \leq N0-j < N0$, the difference between the average values calculated relatively to the instants N0−j to N0 and the straight line passing through the points $(j,R(N0-j))$ and $(N0,R(N0))$ remains below the threshold Emax. Hence, when the curve of the average values exhibits a break in slope (due to a change of direction or to an abrupt change of speed by the mobile station), the speed can be estimated correctly on the basis of the relevant, most recent, portion of the curve.

In another speed estimation method according to the invention, the level of a radio signal received by one of the two stations from the other station is measured at successive measurement instants spaced by a constant measurement interval, and, having obtained values $X(N0-P+1)$ to $X(N0)$ of the signal level at the instants N0−P+1 to N0, N0 designating a measurement and estimation instant and P designating a predetermined integer, a straight line exhibiting a minimum distance with the points $(N0-p,X(N0-p))$ for $0 \leq p < P$ is determined by linear interpolation, and the speed is estimated at the instant N0 on the basis of said minimum distance.

The speed estimate then takes account of the fact that the fading components are generally larger the lower the speed of the mobile.

DESCRIPTION OF PREFERRED EMBODIMENTS

Figure 1:
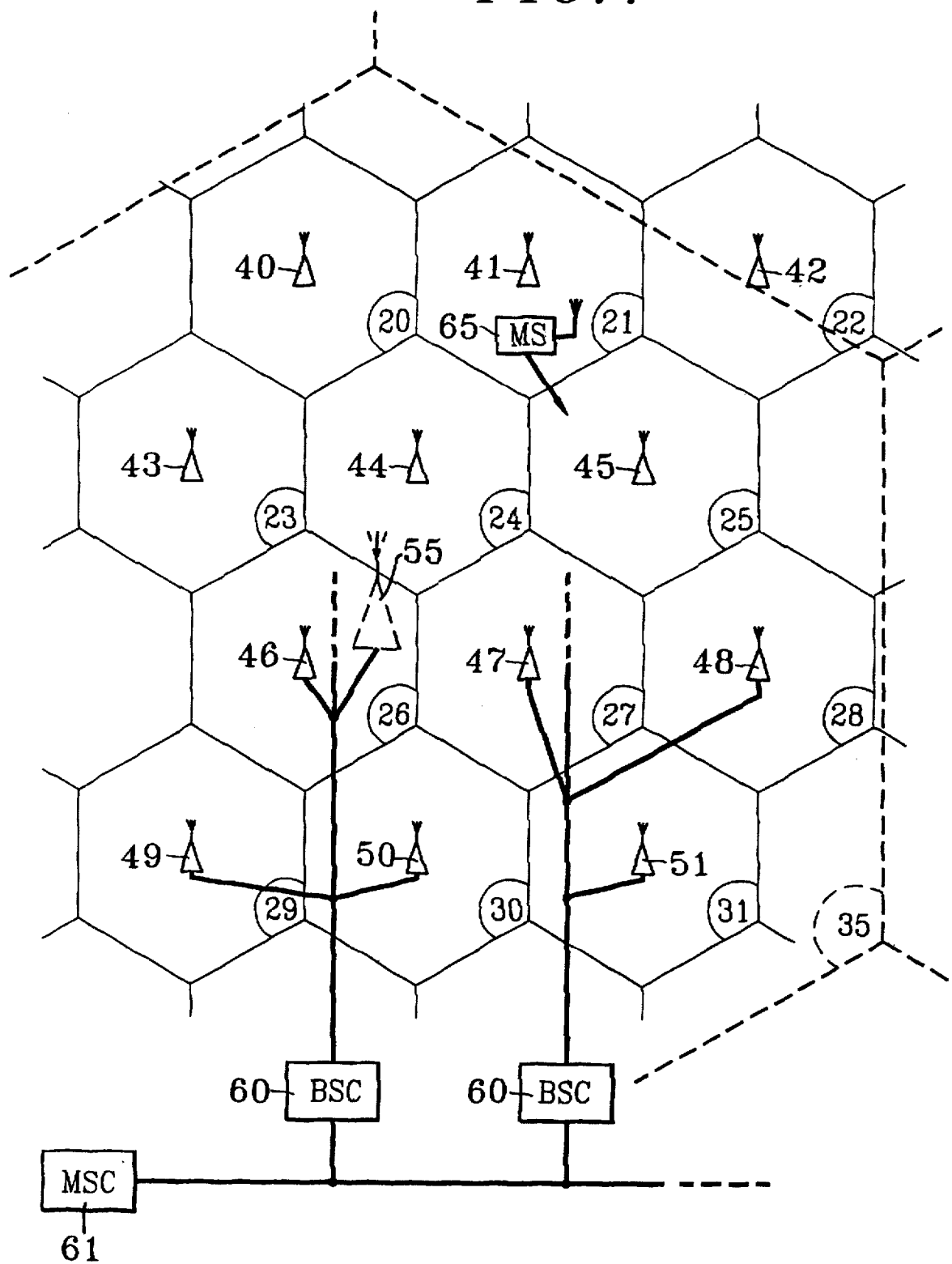
FIG. 1 is a diagram illustrating the partitioning into cells in a multicellular radio communications network.

FIG. 1 illustrates the particular case of a microcellular network (the number M of layers of cells is equal to 2). On a network of microcells 20–31 (layer 1), each served by a respective base station 40–51, is superimposed a network of macrocells 35 (layer 2), each served by a respective base station 55. The base stations 55 of the macrocells have a longer range than those 40–51 of the microcells. The macrocells are thus intended to serve mobile stations moving relatively rapidly (typically terminals moving in motor cars), whereas the microcells are intended to serve slower mobile stations (typically terminals carried by pedestrians). A macrocell most often covers several microcells as FIG. 1 shows, but it can nevertheless happen that certain zones, particularly rural zones, are served only by macrocells.

In FIG. 1 the representation of hexagonal cells is, needless to say, symbolic. In practice, the microcells in an urban environment are often of elongate shape, corresponding, for example, to a segment of a road. Consequently, a "rapid" mobile moves in the majority of cases in a quasi-radial way with respect to the base stations of the microcells.

The diagram of FIG. 1 can be generalized to the case in which the number N of layers of cells is greater than 2. The notions of "rapid" and "slow" mobiles are understood as being related to the cell whose base station is communicating with the mobile.

The invention is described below in the particular case of a GSM-type network. The base stations 40–51, 55 are each linked to a base station controller (BSC) 60 which supervises one or more base stations. The BSCs are linked to a mobile switching center (MSC) 61 providing, particularly, the interface with the switched telephone network.

The HO procedure is based on measurements of communication parameters taken by the mobile station 65 and/or by the base station 40–51, 55 of the source cell to which it is assigned. These measurements are described in GSM Recommendation 05.08. The parameters measured by the mobile station particularly comprise the signal level RXLEV_DL received on the carrier of the broadcast channel BCCH of the base station of the source cell, and the signal levels RXLEV_NCELL(n) which are received on the BCCH carriers transmitted by the base stations of neighboring cells. The neighboring cells to be monitored by the mobile station (and particularly the frequencies of their BCCH carriers) are indicated by the base station of the source cell in its BCCH broadcast channel. The list of these neighboring cells is defined by the operator according to the HOs which he wishes to allow. The RXLEV parameters are each quantized over six bits for a range of −110 to −48 dBm (RXLEV=0 if the received signal level RSL is <110 dBM, RXLEV=1 if −110 dBM≦RSL<−109 dBm, . . . , RXLEV= 63 if RSL≧−48 dBm). The mobile station can also measure a quality parameter RXQUAL_DL, evaluated on the basis of the binary error rate noted by the channel decoder, and a DISTANCE parameter representative of the distance to the base station of the source cell. The parameters measured by the mobile station are transmitted to the base station of the source cell every 480 ms on the SACCH channel. The base station of the source cell can also perform measurements of communication parameters, particularly of the signal level RXLEV_UL received from the mobile station or of the quality RXQUAL_UL of the signal received from the mobile station.

The communication parameters measured are analyzed by the base station and/or by its BSC in order to determine whether criteria are satisfied for handover to one or more neighboring target cells. The measured parameters are first of all averaged over periods defined as multiples of the SACCH period of 480 ms (the exact number of SACCH periods can be set as a parameter by the operator and can differ from one measured parameter to another). The average values obtained are compared with thresholds in order to examine the handover criteria. Certain criteria relate solely to the communication between the base station and the mobile station: cause insufficient RXLEV_DL, cause insufficient RXLEV_UL, cause insufficient RXQUAL_DL and low RXLEV_DL, cause insufficient RXQUAL_UL and low RXLEV_UL, cause excessive DISTANCE. When one of these criteria is satisfied, the BSC triggers a HO to a neighboring target cell from which the mobile station receives an adequate signal level RXLEV_NCELL(n). The relevant thresholds can be set as parameters by the operator.

The PBGT criterion makes it possible to handover a mobile station to a neighboring cell for which the attenuation is less. For a neighboring cell n, the PBGT quantity suggested in the GSM Recommendation 05.08 is expressed:

$$PBGT(n)=(Min(MS\_TXPWR\_MAX\_P,P)-RXLEV\_DL-PWR\_C\_D)-(Min(MS\_TXPWR\_MAX(n),P)-RXLEV\_NCELL(n))$$

with:

MS_TXPWR_MAX_P: maximum transmission power of the mobiles, allowed in the current service cell;

P: maximum power of the mobile,

RXLEV_DL: field level of the current service cell (averaged value);

PWR_C_D: maximum power of the base station minus actual power of the base station;

MS_TXPWR_MAX(n): maximum transmission power from the mobiles, allowed in the neighboring cell n;

RXLEV_NCELL(n): field level received by the mobile from the neighboring cell n (averaged value).

In the particular case in which power monitoring is not activated within the base stations (PWR_C_D=0) and in which the maximum transmission powers allowed in the microcells are below those of the mobiles (MS_TXPWR_MAX(n)≦P) and are equal in all the microcells, the expression for the PBGT is expressed in the form:

$$PBGT(n)=RXLEV\_NCELL(n)-RXLEV\_DL$$

In this particular case, the expression for PBGT reduces to the difference between the field level received by the mobile from the neighboring cell and that received from the current cell.

If n0 designates the service cell and n designates one of the neighboring cell, the PBGT criterion is RXLEV_NCELL (n)>RXLEV_MIN(n) and PBGT(n)>HO_MARGIN (n0, n). The access threshold RXLEV_MIN(n) is defined by the operator in order to allow handover to cell n only if the mobile station is receiving a signal of sufficient level from that cell. The margin HO_MARGIN, defined by the operator, introduces a certain hysteresis by requiring that the attenuation from the neighboring cell is significantly better than that from the source cell for a HO to be triggered. If the PBGT criterion is satisfied for one or more neighboring cells, the BSC triggers a HO to one of these neighboring cells.

The expression "the BSC triggers a HO" is understood to mean that the BSC sends commands to the base stations of the source cell and of the preferred target cell (for example that for which the level RXLEV_NCELL(n) is the highest) if this preferred target cell depends on the same BSC or, if the preferred target cell depends on another BSC, that the BSC sends a request for the handover to the MSC with a list of preferred target cells, for which the signal level RXLEV_NCELL(n) is sufficient. In response to a handover request, the MSC orders the base stations of the source cell and of the target cell adopted to execute the handover, or supplies the necessary data to another MSC if the target cell adopted depends on this other MSC. The target cell adopted is most often that placed in the first position in the list transmitted by the BSC. Traffic considerations may nevertheless lead the MSCs to order handovers according to priority conditions defined by the operator.

Figure 2:
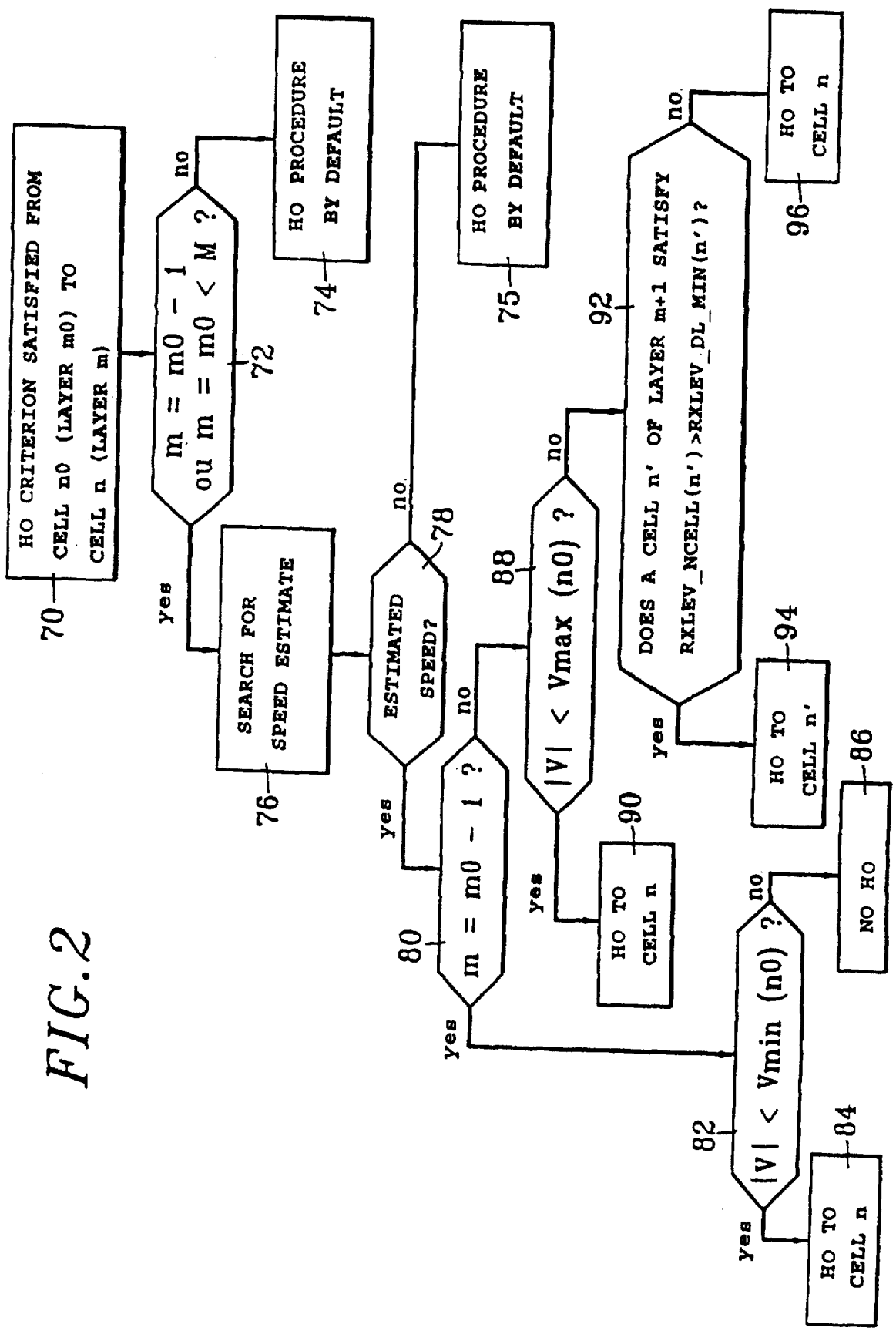
FIG. 2 is a flow chart of a HO control procedure according to the invention.

FIG. 2 illustrates a HO control procedure suitable for a multicellular network in accordance with the invention. In the example described below, this procedure is implemented by the BSC on which the source cell depends, but it will be understood that other entities of the network could undertake some of the stages (or even all of them) of this procedure. Block 70 indicates the observation, by the BSC, that a criterion is satisfied by the mobile station 65 for handover from a source cell n0 of layer m0 to a neighboring target cell n of layer m, according to the conventional process recalled above. The procedure illustrated in FIG. 2 is applicable with any target cell included in the list of preferred target cells which is drawn up upon the handover criterion being satisfied. To simplify matters, it can be considered that the target cell n is the one placed at the head of the list of the target cells, that is to say the one for which the signal level RXLEV_NCELL(n) is the highest if the handover criterion is related to deficient transmission between the base station of the source cell and the mobile station, or that which has the highest PBGT in the case of the PBGT criterion.

The method according to the invention applies in the case in which the target cell n does not belong to a layer higher than that of the source cell, that is to say if m≦m0. In general, the list of possible target cells for a source cell of layer m0, broadcast on its BCCH channel, is defined by the operator in such a way as to include only cells of layer m0−1, m0 or m0+1, the hypotheses in which a handover to layer m0−2 or m0+2 would be appropriate being rare. Hence, at stage 72, the BSC examines whether the target cell of layer m<M belongs to the same layer as the source cell or to the layer immediately below. If m<m0−1 or m>m0 or m=m0=M, a procedure 74 of HO by default (for example that described in Annex A of GSM Recommendation 05.08) is applied. If the test 72 shows that m=m0−1 or m=m0<M, the BSC seeks, at stage 76, to estimate the speed of movement of the mobile station 65 with respect to the base station of the target cell n, on the basis of the signal levels RXLEV_NCELL(n) received by the mobile station from this base station. If the speed of movement cannot be estimated, a procedure by default 75, which can be identical to or different from the procedure 74, is applied.

If it has been possible to estimate the speed of the mobile station 65 and if the target cell belongs to the layer immediately below that of the source cell (tests 78 and 80 positive), the estimated speed V is compared, in absolute value, with a first threshold Vmin(n0) defined relative to the source cell n0. If this comparison 82 shows that |V|<Vmin (n0), the mobile is considered as slow with respect to the source cell, and a HO can be triggered to the target cell n of lower layer. The BSC then triggers the HO to cell n (stage 84). In contrast, if the comparison 82 shows that |V|>Vmin (n0), the mobile is not considered to be sufficiently slow to be handed over to a cell of the lower layer. In this case, no HO is triggered (stage 86).

With reference to FIG. 1, it is possible, for example, to consider the case in which the mobile station is on board a motor car traveling, for example, at 80 km/h and is communicating with the base station 55 of a source macrocell 35. It may be that the PBGT criterion is satisfied to one or more target microcells, for example 21, 25, which would lead to a HO to one of these microcells if the standard procedure were applied. Such a HO is inopportune in view of the considerations according to which the network was designed and optimized. These inopportune HOs can be avoided by the method according to the invention, at least in the majority of cases. If the mobile station 65 assigned to the macrocell 35 is slow (for example: the motor car has slowed down to park), a HO to the microcell is carried out upon the PBGT criterion being satisfied without their being any need to wait for the expiry of a time delay. It will be noted that, if the speed of the mobile station were estimated with respect to the base station 55 of the source macrocell 25, the estimate of the speed would be unreliable, since a rapid mobile station has a significant probability of moving quasi-tangentially to the base station 55 of the macrocell, and the signal levels RXLEV_DL and RXLEV_UL are then not very sensitive to speed. In contrast, as previously mentioned, a "rapid" mobile station has a fairly high probability of moving near-radially with respect to the base station of a microcell close to which it is passing. The speed estimate based on the field levels is therefore more reliable when it is calculated with respect to the target microcell.

If it has been possible to estimate the speed of the mobile station 65 and if the target cell belongs to the same layer, other than the higher layer M, as the source cell (test 78 positive and test 80 negative in FIG. 2), the estimated speed V is compared, in absolute value, with a second threshold Vmax(n0) defined relative to the source cell n0. If this comparison 88 shows that |V|<Vmax(n0), the mobile is not considered as rapid with respect to the source cell of layer m0=m. In this case, there is no drawback in triggering a handover to cell n. The BSC then triggers the HO to cell n (stage 90). If the comparison 88 shows that |V|>Vmax(n0), the mobile is considered to be rapid with respect to the source cell of layer m. If it is possible, it is desirable to execute a handover to a cell of the layer immediately above. At stage 92, the BSC examines whether, among the neighboring cells monitored by the mobile station, a target cell n' of layer m+1 satisfies an acceptance criterion. This acceptance criterion is that the average value RXLEV_NCELL (n') of the signal level at the instant in question exceeds an acceptance threshold RXLEV_DL_HIN(n'). In the majority of cases, if a cell of layer m+1 satisfies the acceptance criterion, it is the only one. If several cells of the layer m+1 happen to satisfy this criterion, the target cell n' is chosen as the one for which the measured field level RXLEV_NCELL (n') is the highest. If the cell n' of layer m+1 is adopted at stage 92, the BSC triggers a handover to this cell n' at stage 94. If no cell n' satisfies the acceptance criterion, the handover is performed to the first target cell n of layer m (stage 96).

The acceptance threshold RXLEV_DL_MIN(n') is defined for each cell by the operator. One possibility is to take this acceptance threshold as being equal to the access threshold RXLEV_MIN(n') used in the handover criteria.

With reference to FIG. 1, the particular case can be considered, for example, in which the mobile station is carried by a pedestrian and is communicating with the base station 41 of a source microcell 21. As the pedestrian is moving slowly, the PBGT criterion (or another handover criterion) can be satisfied for handover to another microcell 25. Upon this criterion being satisfied, the HO to the cell 25 can be triggered without it being necessary to wait for a time delay to expire. If the pedestrian boards a vehicle which starts off and becomes "rapid", the base station 41 of the source microcell obviously has to be left behind, but the target cell 25, initially selected by the BSC when the handover criterion (PBGT or another) was satisfied, may be inappropriate if it is a microcell. In general, the network of macrocells covers that of the microcells, and a macrocell 35 can accept the handover. If this is not the case, the mobile is handed over to the microcell 25 in order to preserve the link by waiting for a macrocell to satisfy the acceptance criterion. In both cases, the BSC can take the appropriate decision without waiting for a time delay to expire.

When m=m0, it is also desirable for the speed estimates to be performed relative to the target cell. This is because, over the period prior to the handover criterion being satisfied, the mobile station generally receives a higher signal level from the source cell than from the target cell. The samples RXLEV_DL or RXLEV_UL over this period undergo clipping at −48 dBm more often than the samples RXLEV_NCELL(n). When it occurs, this clipping prevents the parameter RXLEV_DL or RXLEV_UL from being usable in order to estimate the speed. Over the period prior to the handover criterion being satisfied, the mobile station is generally sufficiently remote from the base station of the target cell for the RXLEV_NCELL(n) measurements to be less than −48 dBm.

Apart from any parameters which are useful for the speed estimation, the operator of the network needs to add to the parameters listed in GSM Recommendation 05.08 the speed thresholds Vmin and Vmax and the acceptance thresholds RXLEV_DL_MIN for the cells of layer m>1 if these acceptance thresholds are different from the access thresholds RXLEV_MIN. For a cell of the first layer, Vmax is defined by the operator as the speed above which a mobile, considered as "rapid" relative to this cell, has to be transferred as soon as possible to a cell of the layer immediately above (there is no threshold Vmin). For a cell of layer M, Vmin corresponds to the speed below which a mobile, considered as "slow" relative to this cell, has to be transferred as soon as possible to a cell of the layer immediately below (there is no threshold Vmax). If M>2, the range [Vmin, Vmax] for a cell of an intermediate layer m (1<m<M) corresponds to the speeds of the mobile stations with which the base station of this cell is intended to communicate.

In the example embodiment of FIG. 2, the base stations of the source cells n0 need to know only their respective thresholds Vmin and Vmax, which simplifies the parameter setting for the operator. It will be noted, however, that, if the base station of a source cell knows the thresholds Vmax relative to the neighboring cells, tests 82 and 88 can each be replaced by [|V|<Vmax(n)?]. The base station of the source cell may in this way take account of possible different parameter settings of the neighboring cells. In this case the operator can restrict himself to defining the thresholds Vmax for the cells of layer m<M, but these have to be known to each neighboring cell from which a HO is possible.

A simplified parameter setting consists in defining thresholds Vmin and Vmax relative to the layers instead of relative to the cells, with Vmin(m+1)=Vmax(m) for 1≦m<M. Each source cell of layer m0 then needs to know only the threshold Vmax(m0) and, if m0>1, the threshold Vmax(m0−1). Tests 82 and 88 are each replaced by [|V|<Vmax(m)?].

The most complete parameter setting, but one implying a greater workload for the operator, consists in defining a speed threshold Vmax(n0,n) relative to each possible [source cell n0, target cell n] pair. If a criterion for handover from cell n0 of layer m0 to cell n of layer m is satisfied (m0=m+1 or m0=m<M), the HO to cell n may not be triggered if |V|>Vmax(n0,n). Tests 82 and 88 are each replaced by [|V|<Vmax(n0,n)?].

A speed estimation method which can be used at stage 76 will now be described. In the example described, the speed estimation is performed by the BSC on which the source cell depends. It will be noted, however, that this estimate could be performed completely or partially by other entities of the network.

Figure 4:
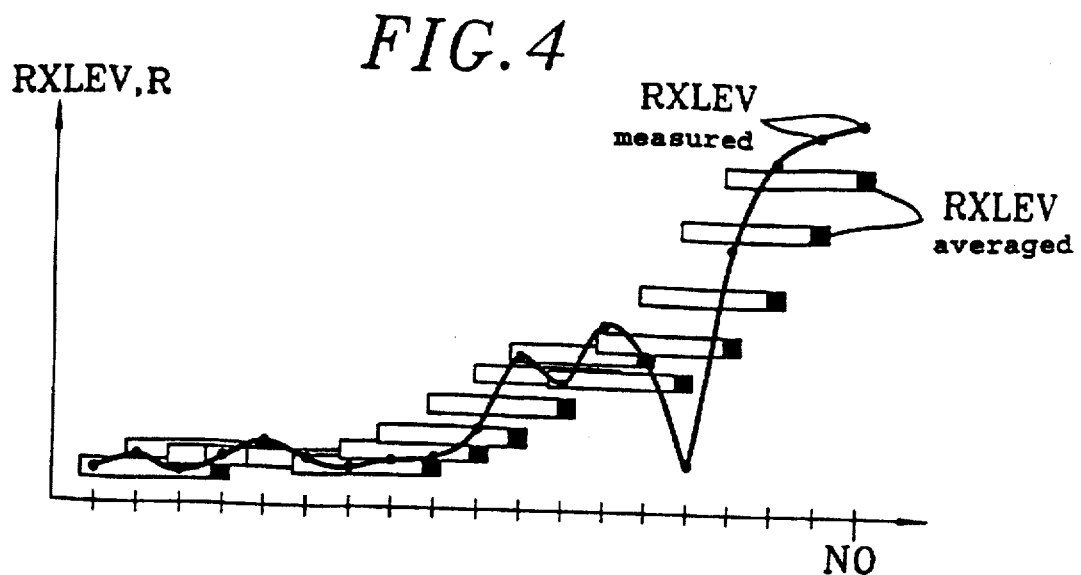
FIGS. 4 to 6 are graphs illustrating the speed estimation using the procedure of FIG. 4.

A preliminary stage consists in calculating average values of the measurements RXLEV_NCELL(n) over a sliding window of L samples. The size L of the sliding window may be the same as that applied to the samples RXLEV_NCELL (n) in the handover criterion which has been satisfied, in which case the average values are already available and need only be stored in memory. The size L can also be a parameter specific to the speed estimation method independently of the handover criterion which has been satisfied. The calculated average values are stored in memory in the BSC in a memory managed in first-in first-out (FIFO) mode. The size of this FIFO memory corresponds to the number Nmax of average values held. The average value R(i) relating to a measurement instant i is an average of the signal levels RXLEV_NCELL(n) measured at the instants i−L+1 to i, for example $$R(i) = \frac{1}{L}\sum_{j=0}^{L-1} \text{RXLEV\_NCELL}(n, i-j)$$

in the case of a rectangular averaging window. FIG. 4 illustrates the process for calculating the average values in the particular case in which L=4.

Figure 3:
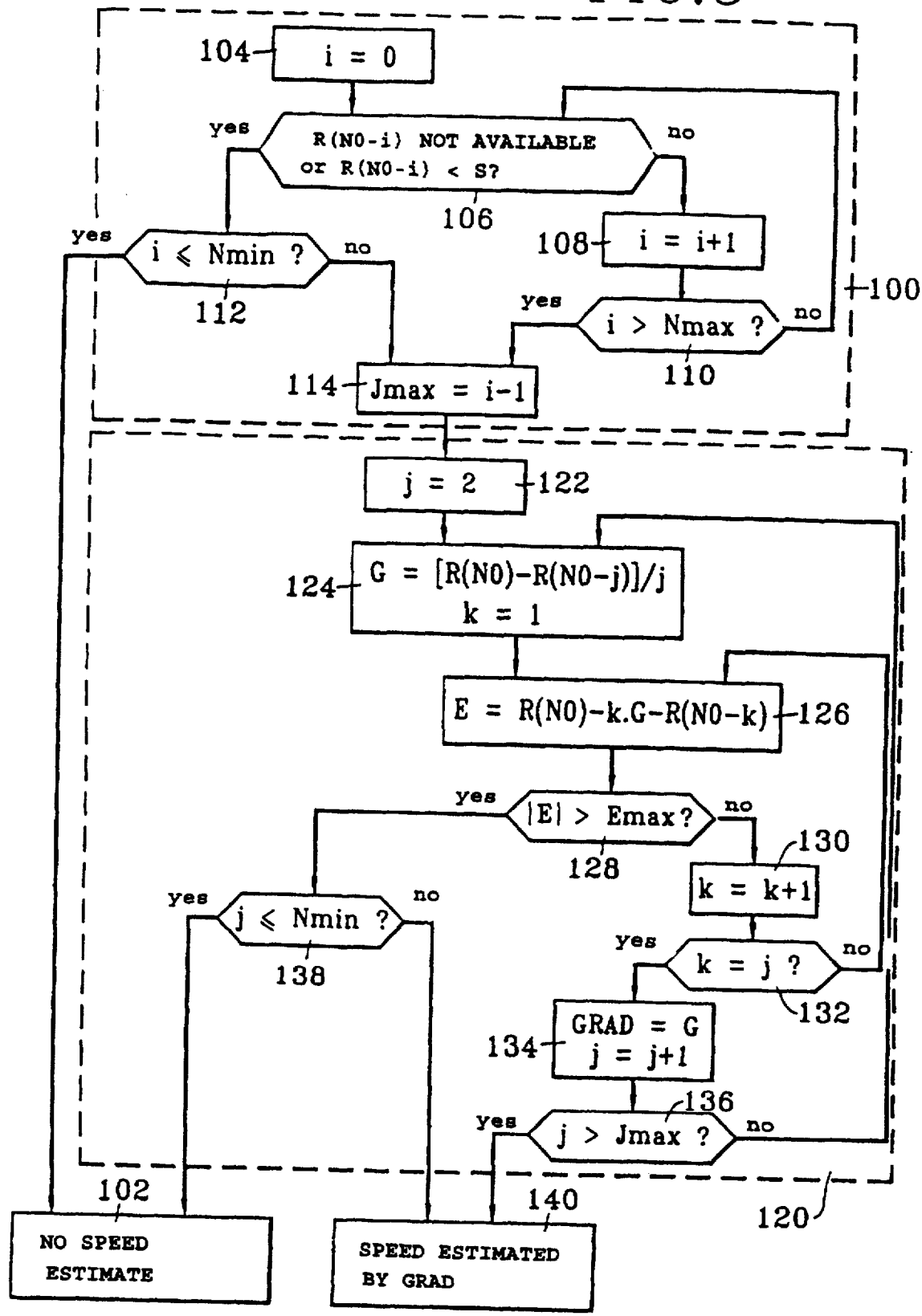
FIG. 3 is a flow chart of a speed estimation procedure according to the invention.

When the handover criterion is satisfied, at an instant N0 of measurement and estimation, the BSC executes the estimation procedure illustrated by FIG. 3. In a first phase 100, the memory-stored average values are examined to see whether they allow a reliable estimation of the speed, that is to say if the last Nmin average values are available and are above a predetermined threshold S. If this condition is not satisfied, the speed cannot be estimated (stage 102), and a HO procedure by default 75 will be used. If the condition is satisfied, phase 100 further comprises the calculation of an integer Jmax corresponding to the number of consecutive measurement instants immediately preceding the instant N0 for which average values R above the threshold S are available.

The phase 100 illustrated by way of example in FIG. 3 starts with initialization of the integer index i to 0 (stage 104). At stage 106, a check is made as to whether R(N0−i) is available and is above the threshold S. If it is, the index i is incremented at 108, then compared with Nmax at 110. If i≦Nmax, stage 106 is repeated for the following iteration of the loop. When test 106 shows that R(N0−i) is either unavailable or below the threshold S, the index i is compared to Nmin at 112. If i≦Nmin, it is considered that the available averages do not allow a reliable estimation of the speed, and stage 102 is entered. When test 112 shows that i>Nmin or when test 110 shows that i>Nmax, the integer Jmax is taken to be equal to i−1 at stage 114. When the loop leads to a value of Jmax, then Nmin≦Jmax≦Nmax.

Phase 100 is followed by a phase 120 of speed estimation. The speed is estimated by the slope of the straight line passing through the points (N0,R(N0)) and (N0−J,R(N0−J)), J being the largest integer equal at most to Jmax such that, or any J lying between 1 and J, the maximum difference E(j,k)=|(1−k/j).R(N0)+(k/j).R(N0−j)]−R(N0−k) between the points (N0−k,R(N0−k)) (0≦k≦j) and the straight line D(j) passing through the points (N0,R(N0)) and (N0−j,R (N0−j)) is below a predetermined threshold Emax (see FIG. 5). If J<Nmin, no speed estimation is performed.

Phase 120 can, for example, run as illustrated in FIG. 3. At initialization 122, the integer index j is taken to be equal to 2. The following stage 124 is the initialization of a loop indexed by the integer k: the variable G is given the value of the slope of the straight line D(j) (G=[R(N0)−R(N0−j)]/j) and the index k is initialized to 1. At stage 126, the difference E(j,k)=E=R(N0)−kG−R(N0−k) is calculated. This difference E is compared, in absolute value, to the threshold Emax at 128. If |E|≦Emax, the index k is incremented at 130 then compared to j at 132. If k<j at stage 132, stage 126 is repeated for the following iteration in the loop indexed by k. When stage 132 shows that k=j, the gradient GRAD is given the value of the variable G and the index j is incremented (stage 134). The index j is then compared with Jmax at 136. If j≦Jmax, stage 124 is repeated for the following iteration in the loop indexed by j. When test 128 shows that |E|>Emax, index j is compared to Nmin at 138. If stage 138 shows that j≦Nmin, this is the case in which J(=j−1) is less than Nmin, and the speed will not be estimated (stage 102). When test 138 shows that j>Nmin or when test 136 shows that j>Jmax, this is the case in which Nmin≦J(=j−1)≦Jmax, and the speed of the mobile is estimated at stage 140 from the gradient GRAD=|R(N0)−R(N0−J)|/J obtained at the preceding iteration.

The speed V of the mobile is estimated proportionally to the gradient GRAD at stage 140. The coefficient of proportionality can be determined empirically by the operator, or on the basis of prior simulations. Another possibility is to take V=GRAD and, for the HO procedure, to define thresholds Vmin and Vmax in appropriate units.

Figure 5:
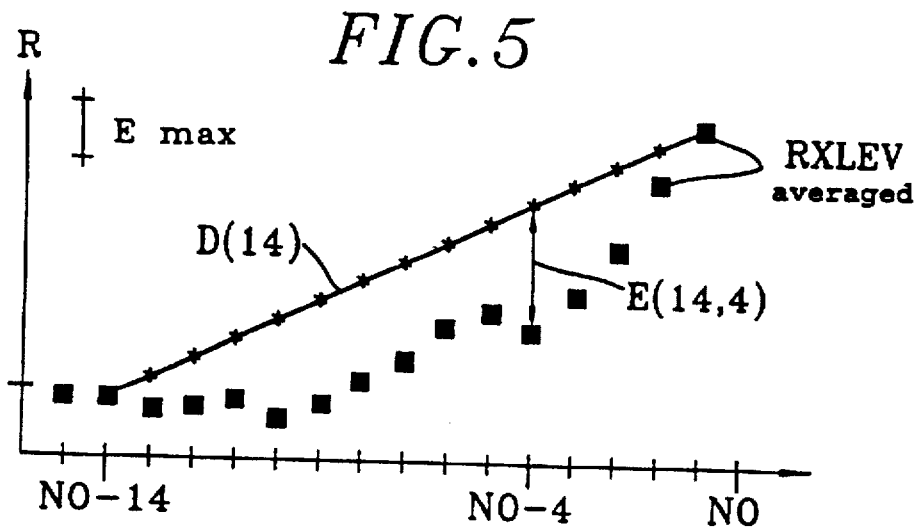

In the particular case of FIG. 5, the first difference E(j,k) which exceeds the threshold Emax is E(14,4). The gradient adopted then corresponds to the slope of the straight line D(13). At instants prior to N0–9, the average of the field levels is practically constant, which corresponds, for example, to the case of a mobile station on board a vehicle stopped at a red light. Optimal parameter setting of Emax makes it possible not to take much account of this stop phase in the speed estimation.

Figure 6:
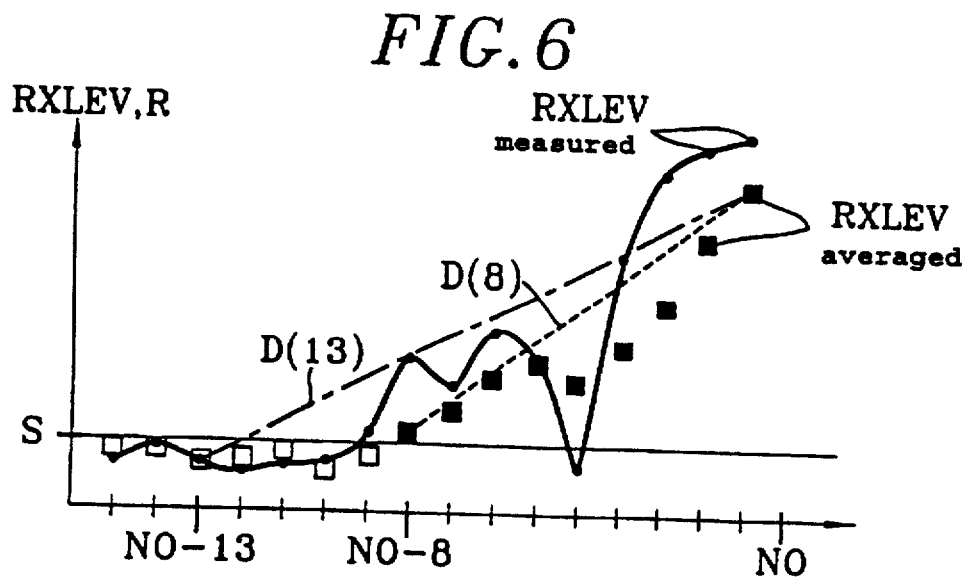

The particular case of FIG. 6 is similar to that of FIG. 5, except that the average values R(N0–15) to R(N0–9) are below the threshold S. Hence Jmax=8, and the gradient value adopted will be the slope of the straight line D(Jmax)= D(8). FIG. 6 shows that the speed estimate is better in this case than by the slope of the straight line D(13). It is preferable for the comparisons with the threshold S to be performed on the average values R rather than on the RXLEV samples. This is because the variation in the field level between two consecutive samples can be significant by reason of masking effects, so that an isolated sample can be below the threshold S although the average values to which it contributes are above the threshold S. In the particular case of FIG. 6, it is seen that the steepest local slope in the interval (N0–4)–(N0–1) corresponds to a rapid variation of RXLEV hich is probably due to a masking effect rather than to the average attenuation. The speed estimation is better when it is based on the slope of the straight line D(8).

In the context of the method for controlling HO in a multicellular network, the speed estimation mode of FIG. 3 has the advantage of allowing adequate treatment of the street corner effects. When the mobile turns the corner of a street the drop in the field level which it receives from its serving base station is abrupt, typically of 20 to 30 dB. If the number of average values available and above the threshold S is sufficient to allow the speed to be estimated, this estimate will be relatively reliable to the extent that it will be based on measurements made prior to the street-corner effect. If this number of average values is not sufficient (Jmax<Nmin or J<Nmin), a HO procedure specific to this case can be used. This other procedure 75 (FIG. 2) can be optimized for the street-corner effect, and can allow the HO to a microcell or the macrocell.

In order to apply the speed estimation method described above, the operator has to define the following parameters, for each cell serving as a basis for the estimates:

- L: size of the averaging window. If the same size as in the satisfied handover criterion is not adopted, a value corresponding to about 10 s can be taken (L≈20).
- Nmax: maximum number of averages to be stored in memory. This number has to be sufficient to allow a correct estimate of the gradient. However, too high a value would require considerable memory space and a long calculating times. In practice, Nmax≦40 can be taken.
- Nmin: minimum number of averages necessary for calculating the gradient. This number is of the order of 10, for example.
- S: threshold above which the calculated averages are taken into consideration. This threshold depends on the engineering of the network (in general≧–95 dBm). It may, for example, be taken to be equal to the access threshold RXLEV_MIN(n) defined in GSM Recommendation 05.08.
- Emax: maximum difference allowed between an average of measurements and a value obtained by linearization. The value of this difference stems directly from the study of measurements or of simulations. In general, Emax is of the order of a few dB.

If the task of parameter setting is judged to be too complicated by the operator, he can define values by default or make these parameters depend only on the layer of the cell in question.

Another speed estimation method which can be used at stage 76 consists in analyzing the dispersion in the values of the signal level RXLEV_NCELL(n) with respect to a straight line obtained by linear interpolation of these values. For this analysis to be possible, at least P previous values of the signal level have to be available. The number P is defined by the operator. In certain cases, it may vary depending on the cell in question. The number P is typically of the order of 10 to 20.

Figure 7:
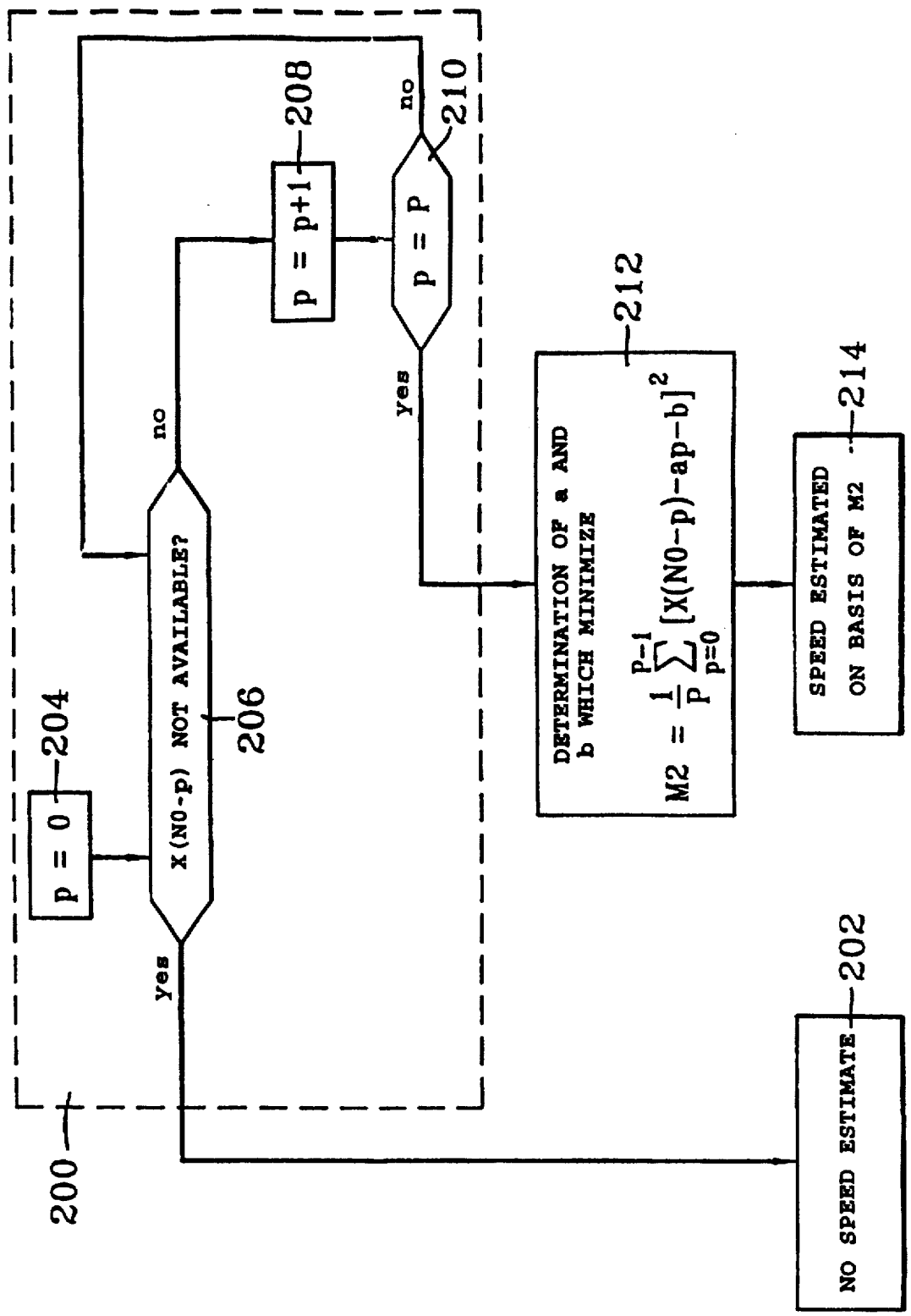
FIG. 7 is a flow chart of another speed estimation procedure according to the invention.

In the example illustrated by FIG. 7, the linear interpolation is an interpolation by least squares. Dispersion is measured by the second-order moment:

$$M2 = \frac{1}{P}\sum_{p=0}^{P-1} |X(N0-p) - ap - b|^2,$$

the coefficients a and b characterizing the interpolation straight line. The notation X(N0–p) here designates the signal level RXLEV_NCELL(n) measured by the mobile station from the target cell at the measurement instant N0–p.

In a first phase 200, a check is made as to whether the number of measurements prior to N0 is sufficient to allow the speed to be estimated. The index p is initialized at 0 (stage 204). If X(N0–p) is available (test 206), the index p is incremented at 208 then compared with P at 210. If p<P, stage 206 is repeated for the following iteration. If p=P, the estimation of the speed proper is entered. If stage 206 shows that X(N0–p) is not available for p<P, the speed estimate will not be performed (stage 202) and a HO procedure by default will be applied.

At stage 212, the coefficients a and b which minimize the second-order moment are determined. The coefficients a and b are obtained simply by solving the linear system:

$$\frac{\partial M2}{\partial a} = 0, \frac{\partial M2}{\partial b} = 0$$

The speed of the mobile is then estimated at stage 214 on the basis of the minimized moment M2.

In general terms, the speed is a decreasing function of the moment M2, as the fading component of the attenuation is all the greater the lower the speed of the mobile. As the least-square fit straight line reflects the average attenuation to a first approximation, the moment M2 makes it possible to distinguish between "slow" mobiles (M2>$M_{threshold}$) and "rapid" mobiles (M2<$M_{threshold}$). The relationship between M2 and the speed cannot generally be determined precisely. The estimate based on M2 nevertheless allows comparisons with thresholds (stages 82 and 88 in FIG. 2) in order to decide whether mobiles are "rapid" or "slow" so as to authorize HOs (a condition of the type |V|<$V_{threshold}$ corresponds to a condition of the type M2>$M_{threshold}$).

The speed estimation based on the second-order moment is principally suited to HO control methods in microcellular networks (M=2).

An interpolation mode other than a least-square fit could be used. For example, instead of minimizing the second-order moment, the first-order moment could be minimized:

$$MI = \frac{1}{P}\sum_{p=0}^{P-1} |X(N0-p) - ap - b|$$

The two speed estimation methods have been described above in the context of the previously described HO control method. It should be noted that they could have other applications, wherever the operator can take advantage of speed information. In the general case, the base station with respect to which the speed is estimated, does not necessarily have to be that of the target cell which is a candidate for a HO. It may be the base station of any neighboring cell n or even the base station of the current service cell. In this latter case, the average values R(N0–j) for the estimation by the gradient are those of the signal level on the corresponding link RXLEV_DL measured by the mobile station or those of the signal level on the uplink RXLEV_UL measured by the base station, and the samples X(N0–j) for the estimation by the moment are the samples RXLEV_DL or RXLEV_UL.

What is claimed is:

1. A method of controlling handover in a multicellular radio communications network, the network including cells of layer m, where m ranges from 1 up to M, a cell of layer m+1 including a base station intended to communicate with mobile stations generally moving more rapidly than mobile stations with which, base stations of cells of layer m are intended to communicate, the method comprising:

measuring communication parameters between a mobile station assigned to a source cell and one of the base station of the source cell and at least one base station of a neighboring cell, the measured communication parameters including a level of at least one signal received by the mobile station from the base station of a neighboring cell, the at least one signal being received and measured by the mobile station at successive measurement instants spaced apart by a constant measurement interval;

analyzing the measured communication parameters to determine instants at which the mobile station satisfies a first handover criterion for handover from the source cell of layer m+1 to a target cell of layer m;

estimating a movement speed of the mobile station with respect to the target cell base station when the first handover criterion is satisfied, wherein the estimating is performed based on the measured levels of the signal received by the mobile station before said first handover criterion is satisfied;

performing a handover of the mobile station to the target cell if the estimated speed is below a first speed threshold, and maintaining the assignment to the source cell if the estimated speed is above the first speed threshold;

estimating, when the analysis of the measured parameters shows that the mobile station satisfies a second handover criterion for handover from a source cell of layer m to a target cell of layer m, the speed of the mobile station with respect to the target cell base station based on the measured levels of the signal received by the mobile station from the target cell base station before said second handover criterion is satisfied; and performing a handover to the target cell if the estimated speed is below a second speed threshold.

2. The method of claim 1, further comprising:

performing a handover to a second neighboring target cell of layer m+1 when analysis of the measured parameters shows that the mobile station satisfies a handover criterion for handover from a source cell of layer m to a first target cell of layer m, the estimated speed of the mobile station with respect to the first target cell base station is above the second speed threshold and the measured level of the signal received by the mobile station from a base station of said second target cell is above an acceptance threshold; and performing a handover to the first target cell if the measured levels of the signals received by the mobile station from each neighboring cell of layer m+1 are below the acceptance threshold.

3. A method of controlling handover in a multicellular radio communications network, the network including cells of layer m, where m ranges from 1 up to M, a cell of layer m+1 including a base station intended to communicate with mobile stations generally moving more rapidly than mobile stations with which base stations of cells of layer m are intended to communicate, the method comprising:

measuring communication parameters between a mobile station assigned to a source cell and one of the base station of the source cell and at least one base station of a neighboring cell, the measured communication parameters including a level of at least one signal received by the mobile station from the base station of a neighboring cell, the at least one signal being received and measured by the mobile station at successive measurement instants spaced apart by a constant measurement interval;

analyzing the measured communication parameters to determine instants at which the mobile station satisfies a first handover criterion for handover from the source cell of layer m+1 to a target cell of layer m;

estimating a movement speed of the mobile station with respect to the target cell base station when the first handover criterion is satisfied, wherein the estimating is performed based on the measured levels of the signal received by the mobile station before said first handover criterion is satisfied;

performing a handover of the mobile station to the target cell if the estimated speed is below a first speed threshold, and maintaining the assignment to the source cell if the estimated speed is above the first speed threshold, wherein, estimating the movement speed of the mobile station with respect to the base station of the target cell comprises the steps of:

calculating, over a sliding window, average values of the measured levels of the signal received by the mobile station from the target cell base station until an instance N0 when the handover criterion is satisfied, an average value R(i), relating to a measurement instant i, being an average of the signal levels measured at instants from i–L+1 to i, where L is an integer representing a size of the sliding window;

obtaining at least Nmin average values relating to Nmin consecutive measurement instants immediately preceding the instant N0, where Nmin is an integer;

determining an oldest measurement instant N0–J, where at least Nmin and at most Jmax measurement intervals occur before the instant N0, Jmax being an integer at least equal to Nmin and the absolute value of the difference E(j,k)=|(1–k/j).R(N0)+(k/j).R(N0–j)|–R(N0–k) is less than a predetermined threshold for every pair of integers j, k, where 1≦k≦J; and estimating the speed at the instant N0 based on the gradient $|R(N0)-R(N0-J)|/J$.

4. The method of claim 3, wherein the movement speed is estimated at the instant N0 on condition that the calculated average values relating to the Nmin consecutive measurement instants immediately preceding the instant N0 are all above a predetermined threshold.

5. The method of claim 4, wherein the integer Jmax is equal, at most, to a predetermined integer Nmax which is greater than Nmin, such that the calculated average values corresponding to the measurement instants N0–Jmax to N0 are all above said predetermined threshold.

6. A method of controlling handover in a multicellular radio communications network, the network including cells of layer m, where m ranges from 1 up to M, a cell of layer m+1 including a base station intended to communicate with mobile stations generally moving more rapidly than mobile stations with which base stations of cells of layer m are intended to communicate, the method comprising:

measuring communication parameters between a mobile station assigned to a source cell and one of the base station of the source cell and at least one base station of a neighboring cell, the measured communication parameters including a level of at least one signal received by the mobile station from the base station of a neighboring cell, the at least one signal being received and measured by the mobile station at successive measurement instants spaced apart by a constant measurement interval;

analyzing the measured communication parameters to determine instants at which the mobile station satisfies a first handover criterion for handover from the source cell of layer m+1 to a target cell of layer m;

estimating a movement speed of the mobile station with respect to the target cell base station when the first handover criterion is satisfied, wherein the estimating is performed based on the measured levels of the signal received by the mobile station before said first handover criterion is satisfied;

performing a handover of the mobile station to the target cell if the estimated speed is below a first speed threshold, and maintaining the assignment to the source cell if the estimated speed is above the first speed threshold, wherein, when estimating the movement speed of the mobile station with respect to the target cell base station at an instant N0, occurring after the handover criterion is satisfied and values X(N0–P+1) to X(N0) of the signal level have been obtained at instants N0–P+1 to N0, where P is a predetermined integer, the estimating step comprises:

determining a straight line exhibiting a minimum distance with points (N0–p,X(N0–p)) where $0 \leq p < P$, by linear interpolation; and estimating the movement speed of the mobile station at the instant N0 based on said minimum distance.

7. The method of claim 6, wherein the linear interpolation is performed by a least-square fit, the minimum distance being a second-order movement between the straight line and the points (N0–p, X(N0–p)).

8. A method for estimating speed of movement of a mobile radio communications station with respect to a base station of a cellular network, comprising the steps of:

measuring levels of a radio signal received by one of the two stations from the other station at successive measurement instants spaced apart by a constant measurement interval;

calculating, over a sliding window, average values of the measured signal levels, an average value R(i) relating to a measurement instant i being an average of the signal levels measured at instants i–L+1 to i, where L is an integer representing the size of the sliding window;

having obtained at least Nmin average values relating to Nmin consecutive measurement instants immediately preceding a measurement and estimation instant N0, where Nmin is an integer, determining an oldest measurement instant N0–J before the instant N0 by at least Nmin measurement intervals and at most Jmax measurement intervals, where Jmax is an integer at least equal to Nmin, such that, for every pair of integers j, k, where $1 \leq k \leq J$, a difference $E(j,k)=|(1-k/j).R(N0)+(k/j).R(N0-j)|-R(N0-k)$ is less than a predetermined threshold; and estimating the movement speed at the instant N0 on the basis of the gradient $|R(N0)-R(N0-J)|/J$.

9. The method of claim 8, wherein the movement speed is estimated at the instant N0 on condition that the calculated average values relating to the Nmin consecutive measurement instants immediately preceding the instant N0 are all above a predetermined threshold.

10. The method of claim 9, wherein the integer Jmax is equal to, at most, a predetermined integer Nmax greater than Nmin, such that the average values calculated relating to the measurement instants N0–Jmax to N0 are all above said predetermined threshold.

11. A method for estimating the speed of movement of a mobile radio communications station with respect to a base station of a cellular network, comprising the steps of:

measuring levels of a radio signal received by one of the two stations from the other station at successive measurement instants spaced apart by a constant measurement interval;

having obtained values X(N0–P+1) to X(N0) of the signal level at instants N0–P+1 to N0, where N0 designates a measurement and estimation instant and P designates a predetermined integer, determining a straight line exhibiting a minimum distance with points (N0–p,X(N0–p)) where $0 \leq p < P$, by linear interpolation; and estimating the movement speed at the instant N0 on the basis of said minimum distance.

12. The method of claim 11, wherein the linear interpolation is performed by a least-square fit, the minimized distance being a second-order moment between the straight line and the points (N0–p, X(N0–p)).

* * * * *